United States Patent
van Riel et al.

(10) Patent No.: US 11,157,302 B2
(45) Date of Patent: *Oct. 26, 2021

(54) IDLE PROCESSOR MANAGEMENT IN VIRTUALIZED SYSTEMS VIA PARAVIRTUALIZATION

(71) Applicant: Red Hat Israel, Ltd., Raanana (IL)

(72) Inventors: Henri Han van Riel, Concord, NH (US); Michael Tsirkin, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 132 days.

This patent is subject to a terminal disclaimer.

(21) Appl. No.: 16/411,105

(22) Filed: May 13, 2019

(65) Prior Publication Data

US 2019/0266008 A1    Aug. 29, 2019

Related U.S. Application Data

(63) Continuation of application No. 14/149,061, filed on Jan. 7, 2014, now Pat. No. 10,289,437.

(51) Int. Cl.
| | |
|---|---|
| *G06F 9/455* | (2018.01) |
| *G06F 1/3287* | (2019.01) |
| *G06F 1/3206* | (2019.01) |
| *G06F 1/3228* | (2019.01) |
| *G06F 9/48* | (2006.01) |
| *G06F 9/50* | (2006.01) |
| *G06F 8/20* | (2018.01) |
| *G06F 8/71* | (2018.01) |

(52) U.S. Cl.
CPC ........ *G06F 9/45558* (2013.01); *G06F 1/3206* (2013.01); *G06F 1/3228* (2013.01); *G06F 1/3287* (2013.01); *G06F 9/4893* (2013.01); *G06F 9/50* (2013.01); *G06F 8/20* (2013.01); *G06F 8/71* (2013.01); *Y02D 10/00* (2018.01)

(58) Field of Classification Search
None
See application file for complete search history.

(56) References Cited

U.S. PATENT DOCUMENTS

| | | |
|---|---|---|
| 8,191,062 B2 | 5/2012 | Grobman |
| 8,296,761 B2 | 10/2012 | Ueno et al. |
| 8,296,767 B1 | 10/2012 | Waldspurger et al. |
| 8,341,628 B2 | 12/2012 | Arndt et al. |
| 8,364,997 B2 | 1/2013 | Tian et al. |

(Continued)

OTHER PUBLICATIONS

Diao, et al., "Prediction of CPU Idle-Busy Activity Pattern", 2008, IEEE, pp. 27-36. (Year: 2008).*

(Continued)

*Primary Examiner* — Qing Yuan Wu
(74) *Attorney, Agent, or Firm* — Lowenstein Sandler LLP

(57) ABSTRACT

A system and method are disclosed for managing idle processors in virtualized systems. A hypervisor executing on a host comprising one or more physical processors receives an anticipated idle time for a physical processor of the one or more physical processors of the host from a guest operating system of a virtual machine executing on the host. In response to determining that a function of the anticipated idle time exceeds an exit time of a first power state of the physical processor, the physical processor is caused to be halted and placed in the first power state.

20 Claims, 6 Drawing Sheets

(56) References Cited

U.S. PATENT DOCUMENTS

| | | | |
|---|---|---|---|
| 8,539,010 | B2 | 9/2013 | Inakoshi |
| 8,887,171 | B2 | 11/2014 | Song et al. |
| 9,292,060 | B1 | 3/2016 | Marr et al. |
| 9,310,864 | B1 | 4/2016 | Klein et al. |
| 9,348,391 | B1 | 5/2016 | Marr et al. |
| 9,547,353 | B1 | 1/2017 | Marr et al. |
| 2007/0028244 | A1 | 2/2007 | Landis et al. |
| 2010/0115315 | A1 | 5/2010 | Davis et al. |
| 2010/0218183 | A1 | 8/2010 | Wang et al. |
| 2010/0257524 | A1 | 10/2010 | Weissman et al. |
| 2011/0010713 | A1 | 1/2011 | Matsumoto et al. |
| 2011/0119422 | A1 | 5/2011 | Grouzdev |
| 2011/0154323 | A1 | 6/2011 | Arndt et al. |
| 2011/0161627 | A1 | 6/2011 | Song et al. |
| 2011/0213997 | A1 | 9/2011 | Kansai et al. |
| 2011/0246800 | A1 | 10/2011 | Accpadi et al. |
| 2012/0011378 | A1 | 1/2012 | Dalton et al. |
| 2012/0079480 | A1 | 3/2012 | Liu |
| 2012/0096293 | A1 | 4/2012 | Floyd et al. |
| 2013/0007494 | A1* | 1/2013 | Branover ............ G06F 1/3203 713/323 |
| 2013/0290752 | A1 | 10/2013 | Jones et al. |
| 2013/0305075 | A1 | 11/2013 | Vasan et al. |
| 2013/0346766 | A1 | 12/2013 | Tani |
| 2014/0137105 | A1 | 5/2014 | Garg et al. |
| 2014/0143774 | A1 | 5/2014 | Adams et al. |
| 2014/0149988 | A1 | 5/2014 | Huang et al. |
| 2014/0181811 | A1 | 6/2014 | Tsirkin |
| 2014/0254369 | A1 | 9/2014 | Kulkarni |
| 2014/0281629 | A1 | 9/2014 | Bose et al. |
| 2015/0058846 | A1 | 2/2015 | Zheng et al. |
| 2015/0095009 | A1 | 4/2015 | Brook et al. |
| 2015/0169036 | A1 | 6/2015 | Sodhi et al. |
| 2015/0212841 | A1 | 7/2015 | Tsirkin et al. |
| 2015/0242229 | A1 | 8/2015 | van Riel et al. |
| 2015/0339155 | A1 | 11/2015 | Tsirkin |
| 2015/0347171 | A1 | 12/2015 | Tsirkin |
| 2016/0077571 | A1 | 3/2016 | Sagar et al. |
| 2016/0203012 | A1 | 7/2016 | Dong et al. |
| 2017/0091357 | A1 | 3/2017 | Brock et al. |

OTHER PUBLICATIONS

Fayyad-Kazan et al., "Full and Para-Virtualization with Xen: A Performance Comparison", CIS, vol. 4, No. 9, Sep. 2013, pp. 719-727; <https://pdfs.semanticscholar.org/d716/bc20c582e4b558240e13ecf701305c63ac92.pdf> (Year: 2013).

Legout et al., "Paravirtualizing Linux in a real-time hypervisor", ACM, vol. 9, Issue 2, Jun. 2012, pp. 1-5; <https://dl .acm.org/citation .cfm?id=2318842> (Year: 2012).

Gupta et al., "PowerTune: Differentiated Power Allocation in Over-provisioned Multicore Systems", IEEE, May 2013, pp. 860-867; <https://ieeexplore .ieee .org/stamp/stamp .jsp?tp=&amumber=6650966> (Year: 2013).

USPTO, Final Office Action for U.S. Appl. No. 14/191,856 dated Sep. 25, 2018.

USPTO, Final Office Action for U.S. Appl. No. 14/191,856 dated Jul. 26, 2017.

USPTO, Non-Final Office Action for U.S. Appl. No. 14/191,856 dated Mar. 31, 2017.

USPTO, Final Office Action for U.S. Appl. No. 14/191,856 dated Dec. 16, 2016.

USPTO, Non-Final Office Action for U.S. Appl. No. 14/191,856 dated Aug. 26, 2016.

Jung et al., "A Virtual CPU Scheduling Model for I/O Performance in Paravirtualized Environments", ACM, Sep. 2017, RACS'17, pp. 281-286; <https://dl.acm.org/citation cfm?id=3131703> (Year: 2017).

Ali et al., "A Power Aware NUMA Scheduler in VMware's ESXi Hypervisor", IEEE, Nov. 2015, pp. 193-202; <https://ieeexplore.ieee.org/stamp/stamp.jsp?tp=&arnumber=7314165> (Year: 2015).

Sharif et al., "Power-efficient distributed scheduling of virtual machines using workload-aware consolidation techniques", Springer, Jul. 2011, vol. 61, Issue 1, pp. 46-66; <https://link.springer.com/content/pdf/10.1007%2Fs 11227-011-0658-5.pdf> (Year: 2011).

Vija Yrajan, P ., "Analysis of Performance in the Virtual Machines Environment", International Journal of Advanced Science and Technology, Jul. 2011, pp. 53-64, vol. 32.

Bong, X et al., "Characterizing the Performance and Scalability of Many-core Applications on Virtualized Platforms", Prallel Processing Institute Technical Report No. FDUPPITR-2010-002, Nov. 2010, 17 pages, Shanghai, China.

Cheng, L., et al., "vBalance: Using Interrupt Load Balance to Improve I/0 Performance for SMP Virtual Machines", Proceedings of the Third ACM Symposium on Cloud Computing, Oct. 14-17, 2012, 14 pages, San Jose, California.

USPTO, Non-Final Office Action for U.S. Appl. No. 14/191,856 dated Oct. 26, 2015.

USPTO, Final Office Action for U.S. Appl. No. 14/191,856 dated Feb. 29, 2016.

* cited by examiner

IDLE PROCESSOR MANAGEMENT IN VIRTUALIZED SYSTEMS VIA PARAVIRTUALIZATION

CROSS-REFERENCE TO RELATED APPLICATIONS

This application is a continuation application of co-pending U.S. patent application Ser. No. 14/149,061, filed on Jan. 7, 2014, entitled, "IDLE PROCESSOR MANAGEMENT IN VIRTUALIZED SYSTEMS VIA PARAVIRTUALIZATION," which is herein incorporated by reference.

TECHNICAL FIELD

This disclosure relates to computer systems, and more particularly, to virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine" or a "physical machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps to a device of the host machine (e.g., a network interface device, a CD-ROM drive, etc.). For example, a virtual machine may comprise a virtual disk that is mapped to an area of storage (known as a "disk image") of a particular storage device (e.g., a magnetic hard disk, a Universal Serial Bus [USB] solid state drive, a Redundant Array of Independent Disks [RAID] system, a network attached storage [NAS] array, etc.) The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
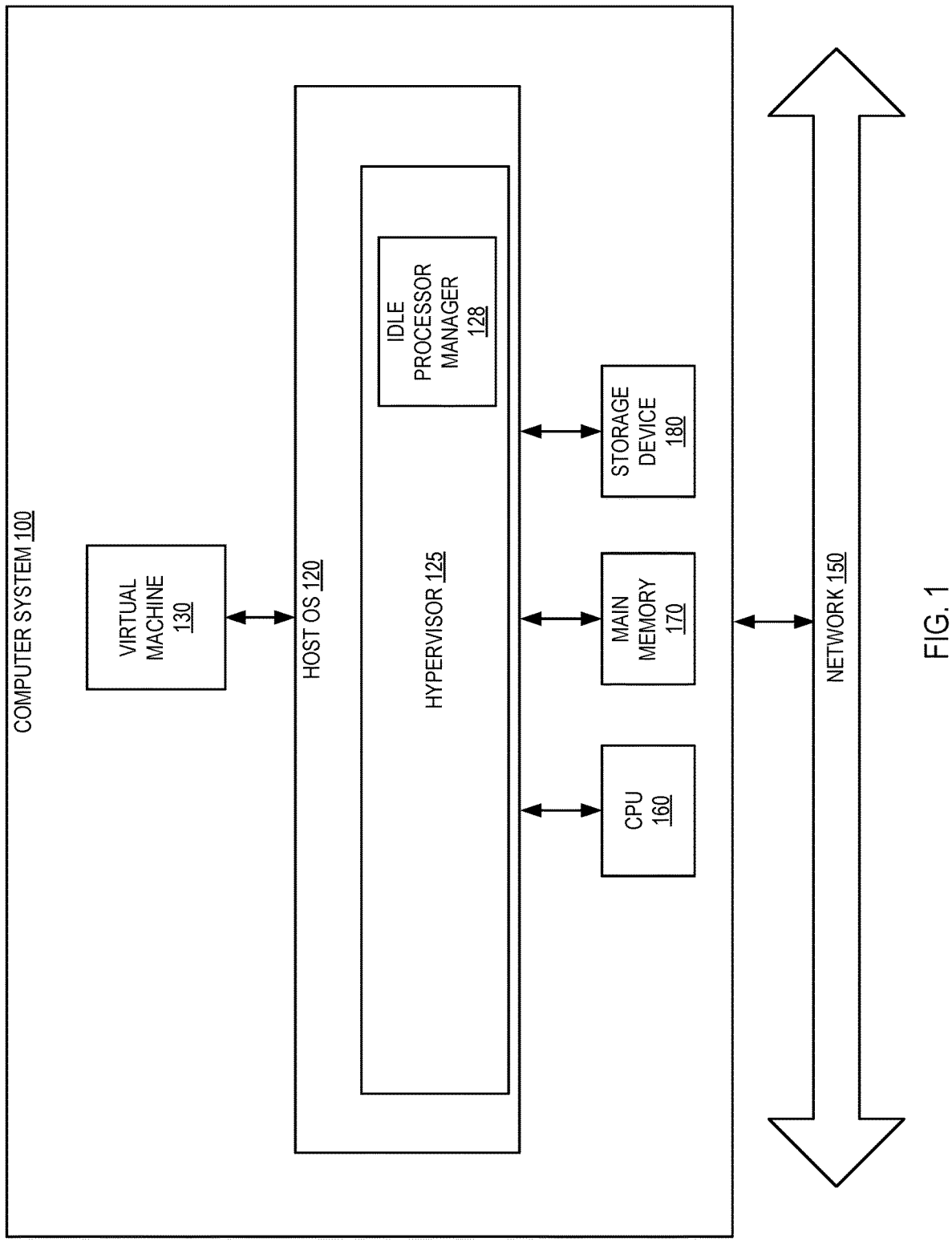
FIG. 1 depicts an illustrative computer system architecture, in accordance with an embodiment of the present disclosure.

Described herein is a system and methods for managing idle processors in virtualized systems. In accordance with one embodiment, a hypervisor executing on a host computer receives an anticipated idle time for a processor of the host computer system from a guest operating system of a virtual machine executing on the host computer system. When the anticipated idle time divided by a performance multiplier exceeds an exit time of a first power state of the processor, the processor is caused to halt. In one embodiment, the processor also enters the first power state.

In accordance with one embodiment, the first power state is selected from a plurality of possible power states of the processor, such that the following two conditions are satisfied:
 (i) the exit time of the first power state is less than [the anticipated processor idle time divided by the performance multiplier], as noted above; and
 (ii) if any other power state has an exit time less than [the anticipated processor idle time divided by the performance multiplier], then this exit time is less than or equal to the first power state's exit time.

In other words, the first power state is the power state having the largest exit time less than [the anticipated processor idle time divided by the performance multiplier]. As an example, suppose that the anticipated idle time is 21 (units ignored), the performance multiplier is 3, and a processor has four power states with respective exit times {2, 4, 6, 8}. Then the power state with exit time 6 would be selected, as this is the largest exit time that is less than 21/3=7. Thus, in accordance with this embodiment, the "deepest" possible power state is selected.

In one embodiment, the performance multiplier is based on an average load of the processor, or a number of input/output wait tasks of the processor, or both. In accordance with some embodiments, the processor complies with the Advanced Configuration and Power Interface (ACPI) standard for device configuration and power management. In such embodiments, the processor can occupy one of four ACPI processor states: C0, C1, C2 and C3.

In accordance with some embodiments of the present disclosure, the guest operating system is paravirtualized to provide anticipated processor idle times to the hypervisor. Paravirtualization is a technique by which a guest operating system is modified and recompiled to execute on top of a hypervisor. More particularly, in some embodiments, one or more commands may be added to the guest operating system (OS) so that the guest OS, upon determining that the processor will be idle, provides an anticipated idle time to the hypervisor. In some such embodiments, existing code of the guest OS (i.e., code of the guest OS prior to paravirtualization) may include routines for determining that the processor will be idle and estimating an anticipated idle time, while in some other embodiments code for one or both of these tasks may be added to the guest OS in addition to code for providing the anticipated idle time to the hypervisor.

Embodiments of the present disclosure thus use paravirtualization to obtain more accurate estimates of how long a processor will be idle. In contrast, in virtualized systems of the prior art, the hypervisor guesses the idle times. Moreover, by providing more accurate estimates of processor idle times, embodiments of the present disclosure can reduce latencies incurred by processor wake-ups, thereby improving system performance while simultaneously reducing power consumption.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1.

As shown in FIG. 1, the computer system 100 is connected to a network 150 and comprises central processing unit (CPU) 160, main memory 170, which may include volatile memory devices (e.g., random access memory (RAM)), non-volatile memory devices (e.g., flash memory), and/or other types of memory devices, and storage device 180 (e.g., a magnetic hard disk, a Universal Serial Bus [USB] solid state drive, a Redundant Array of Independent Disks [RAID] system, a network attached storage [NAS] array, etc.) that serves as a secondary memory, interconnected as shown. The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 runs a host operating system (OS) 120, which comprises software, hardware, or both, that manages the hardware resources of the computer system and that provides functions such as interprocess communication, scheduling, virtual memory management, and so forth. In some examples, host operating system 120 also comprises a hypervisor 125, which provides a virtual operating platform for virtual machine 130 and that manages its execution. In accordance with one such example, hypervisor 125 includes an idle processor manager 128 that is capable of: receiving messages from VM 130 that specify an anticipated idle time for CPU 160; computing a performance multiplier; determining a power state of CPU 160 that has an exit time less than the quotient of the anticipated idle time divided by the performance multiplier; and, when such a power state is determined, of halting CPU 160 and placing CPU 160 in the determined power state; as described in detail below with respect to FIGS. 3 and 4. It should be noted that in some other examples, hypervisor 125 may be external to host OS 120, rather than embedded within host OS 120.

Virtual machine 130 is a software implementation of a machine that executes programs as though it were an actual physical machine. It should be noted that although, for simplicity, a single virtual machine is depicted in FIG. 1, in some other embodiments computer system 100 may host a plurality of virtual machines. Virtual machine 130 is described in more detail below with respect to FIG. 2.

Figure 2:
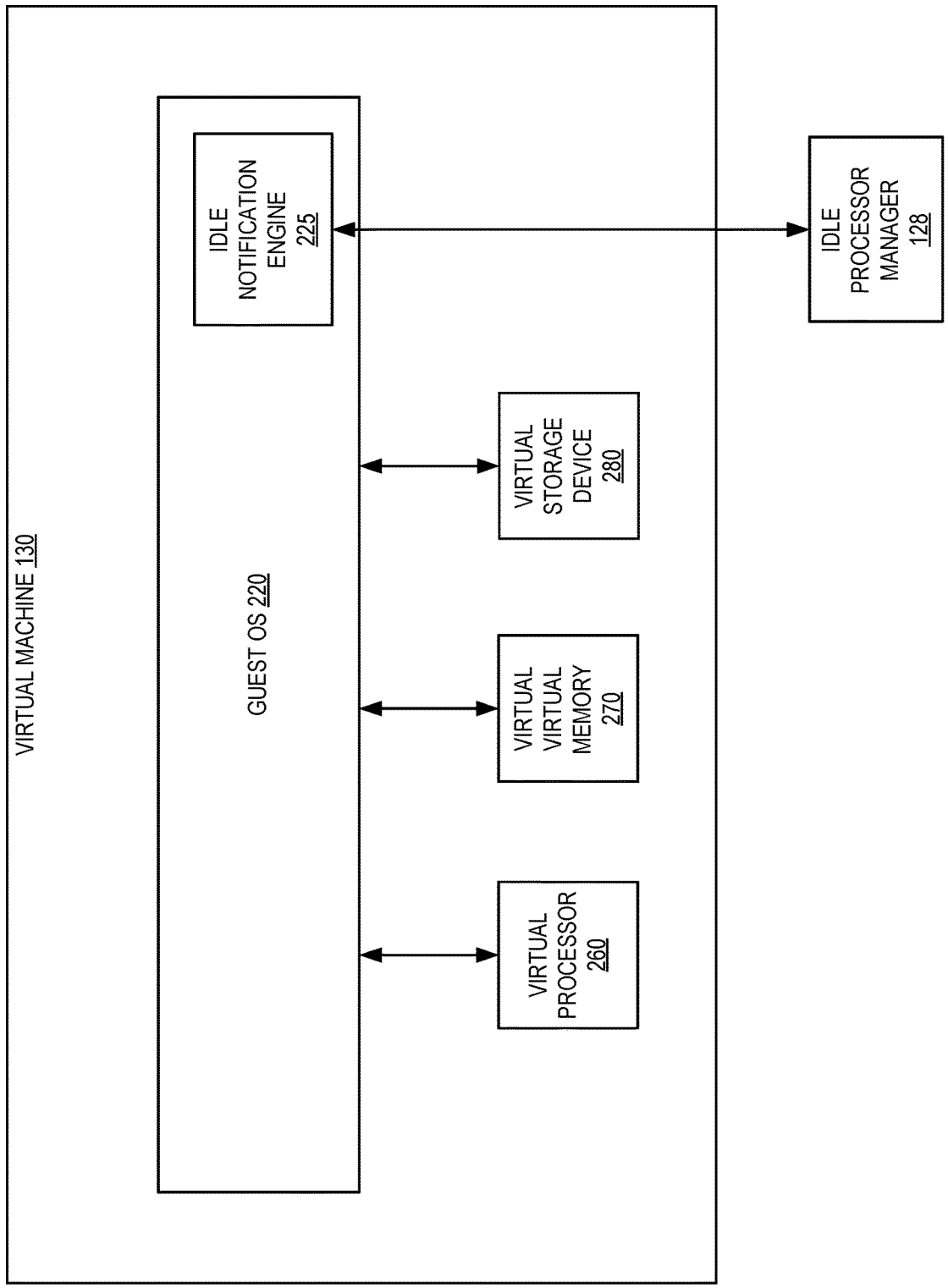
FIG. 2 depicts a block diagram of elements of a virtual machine, in accordance with an embodiment of the present disclosure.

FIG. 2 depicts a block diagram of elements of virtual machine 130, in accordance with an embodiment of the present disclosure. As shown in FIG. 2, virtual machine 130 comprises a guest operating system 220, a virtual processor 260, a virtual virtual memory 270, and a virtual storage device 280.

Virtual processor 260 emulates a physical processor and maps to central processing unit (CPU) 160; similarly, virtual storage device 280 emulates a physical storage device and maps to storage device 180. Virtual virtual memory 270 maps virtual addresses of virtual machine 130 to addresses of the host OS 120's virtual memory, which in turn maps to physical addresses in main memory 170. In one embodiment, hypervisor 125 manages these mappings in a transparent fashion, so that guest OS 220 and applications executing on virtual machine 130 interact with virtual processor 260, virtual virtual memory 270, and virtual storage device 280 as though they were actual physical entities. As noted above, in embodiments where computer system 100 comprises a plurality of CPUs 160, rather than a single CPU, virtual machine 130 may also comprise a plurality of virtual processors 260. Similarly, in embodiments where computer system 100 comprises a plurality of storage devices 180, rather than a single storage device, virtual machine 130 may also comprise a plurality of storage devices 180.

Guest operating system (OS) 220 manages virtual machine resources and provides functions such as interprocess communication, scheduling, memory management, and so forth. In accordance with one embodiment, guest OS 220 is modified via paravirtualization to include an idle notification engine 225 that is capable of determining that virtual processor 260, and by extension CPU 160, will be idle; estimating an anticipated idle time for CPU 160; and providing the anticipated idle time to idle processor manager 128 of hypervisor 125; as described in detail below with respect to FIG. 5.

Figure 3:
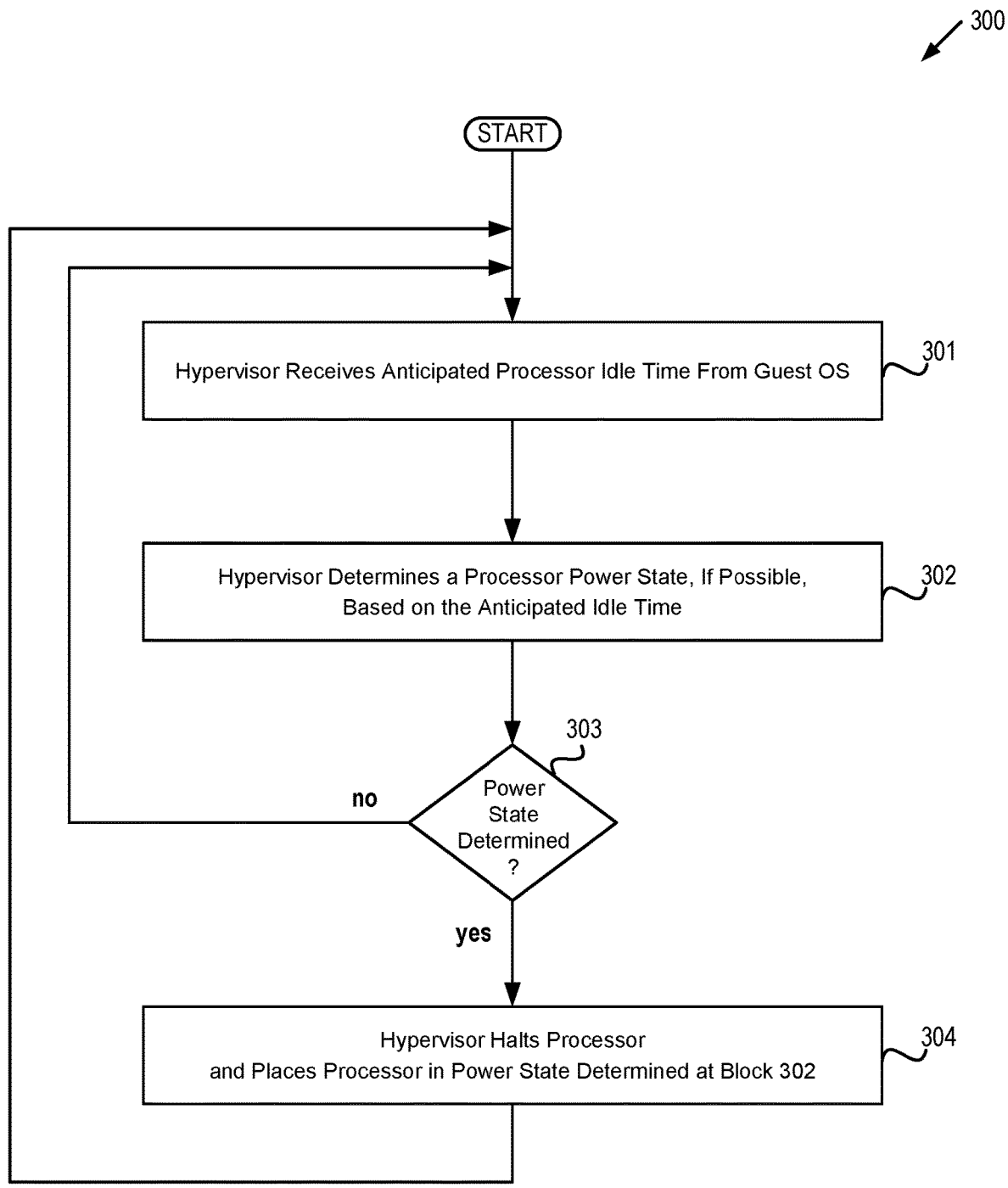
FIG. 3 depicts a flow diagram of one example of a method by which a hypervisor manages processor power states.

FIG. 3 depicts a flow diagram of one example of a method 300 by which a hypervisor manages processor power states. The method is performed by processing logic that may comprise hardware (circuitry, dedicated logic, etc.), software (such as is run on a general purpose computer system or a dedicated machine), or a combination of both. In one embodiment, the method is performed by hypervisor 125 of computer system 100, while in some other embodiments, the method may be performed by a hypervisor hosted by some other machine. It should be noted that in some other embodiments blocks depicted in FIG. 3 may be performed simultaneously or in a different order than that depicted.

At block 301, hypervisor 125 receives an anticipated processor idle time from guest OS 220 of virtual machine 130. It should be noted that the anticipated idle time may be provided in a variety of ways, such as via a message from guest OS 220 to hypervisor 125, or by storing the anticipated idle time in a predefined location of memory 170 that is read by hypervisor 125, etc. In one embodiment, block 301 is performed by idle processor manager 128.

At block 302, hypervisor 125 determines a power state for CPU 160, if possible, based on the anticipated idle time received at block 301. Embodiments of operations involved in performing block 302 are described in detail below with respect to FIG. 4.

Block 303 branches based on whether a power state for CPU 160 was determined at block 302. If so, execution proceeds to block 304, otherwise execution continues back at block 301.

At block 304, hypervisor 125 halts CPU 160 and places CPU 160 in the power state determined at block 302. In one embodiment, block 304 is performed by idle processor manager 128. After block 304 is performed, execution continues back at block 301.

Figure 4:
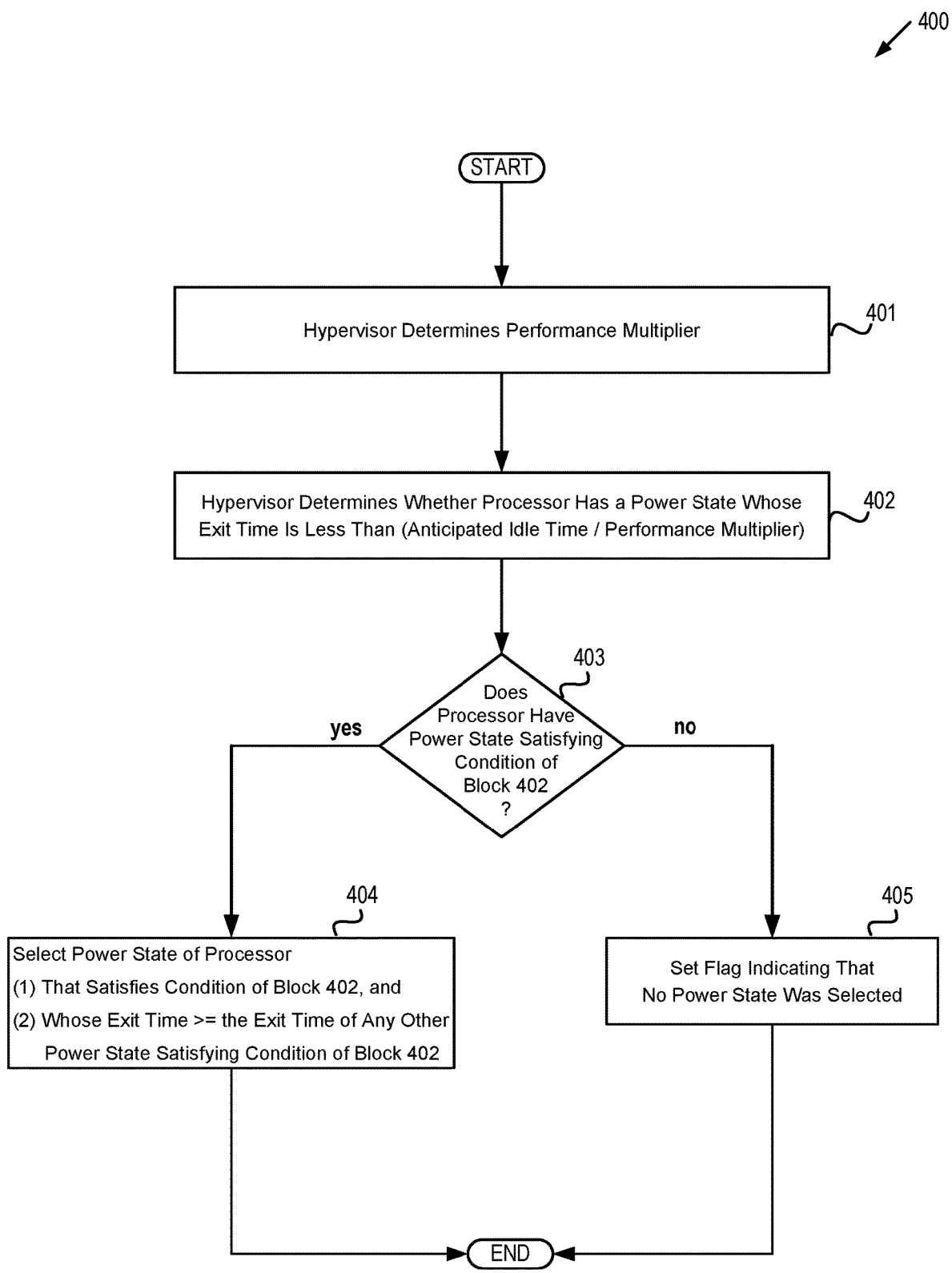
FIG. 4 depicts a flow diagram of one example of a method for selecting a power state for a processor based on an anticipated idle time for the processor.

FIG. 4 depicts a flow diagram of one example of a method 400 for selecting a power state for a processor based on an anticipated idle time for the processor. The method is performed by processing logic that may comprise hardware (circuitry, dedicated logic, etc.), software (such as is run on a general purpose computer system or a dedicated machine), or a combination of both. In one embodiment, the method is performed by hypervisor 125 of computer system 100 with respect to CPU 160, while in some other embodiments, the method may be performed by a hypervisor hosted by some other machine, or may be performed with respect to another CPU, or both. It should be noted that in some other embodiments blocks depicted in FIG. 4 may be performed simultaneously or in a different order than that depicted.

At block 401, hypervisor 125 determines the value of a performance multiplier. In some embodiments, the performance multiplier may be based on an average load of CPU 160, while in some other embodiments, the performance multiplier may be based on the number of input/output wait (I/O) tasks of CPU 160, while in yet other embodiments, the performance multiplier may be based on both the average load and the number of I/O wait tasks. In one embodiment, the performance multiplier is computed according to the equation:

$$m = a + b \cdot \lambda + c \cdot \omega$$

where $\lambda$ is the average load of CPU 160, $\omega$ is the number of I/O wait tasks of CPU 160, and a, b, and c are positive real numbers. It should be noted that in some embodiments the average load may be a simple (i.e., "plain vanilla") average over a given time interval, while in some other embodiments the average load may be another type of average (e.g., a weighted average, an exponential time-decayed average, etc.). In one embodiment, block 401 is performed by idle processor manager 128.

At block 402, hypervisor 125 determines whether CPU 160 has a power state whose exit time is less than the quotient of the anticipated idle time divided by the performance multiplier. In one embodiment, CPU 160 complies with the Advanced Configuration and Power Interface (ACPI) standard for device configuration and power management and can occupy one of four ACPI processor states: C0, C1, C2 and C3.

Block 403 branches based on whether CPU 160 does have a power state whose exit time is less than [anticipated idle time/performance multiplier]. If so, execution continues at block 404, otherwise execution continues at block 405.

At block 404, hypervisor 125 selects a power state of CPU 160. In one embodiment, hypervisor 125 selects a power state P of CPU 160 such that:
 (i) the exit time of the power state P is less than [the anticipated processor idle time divided by the performance multiplier]; and
 (ii) if any other power state has an exit time less than [the anticipated processor idle time divided by the performance multiplier], then this exit time is less than or equal to the power state P's exit time.

In other words, power state P is the power state of CPU with the largest exit time less than [the anticipated processor idle time divided by the performance multiplier]. Thus, in this embodiment hypervisor 125 selects the "deepest" possible power state at block 404.

It should be noted that when CPU 160 complies with the ACPI standard, hypervisor 125 selects one of the four ACPI processor states C0, C1, C2 and C3 at block 404. In one embodiment, block 404 is performed by idle processor manager 128. At block 405, a flag is set indicating that no power state was selected.

Figure 5:
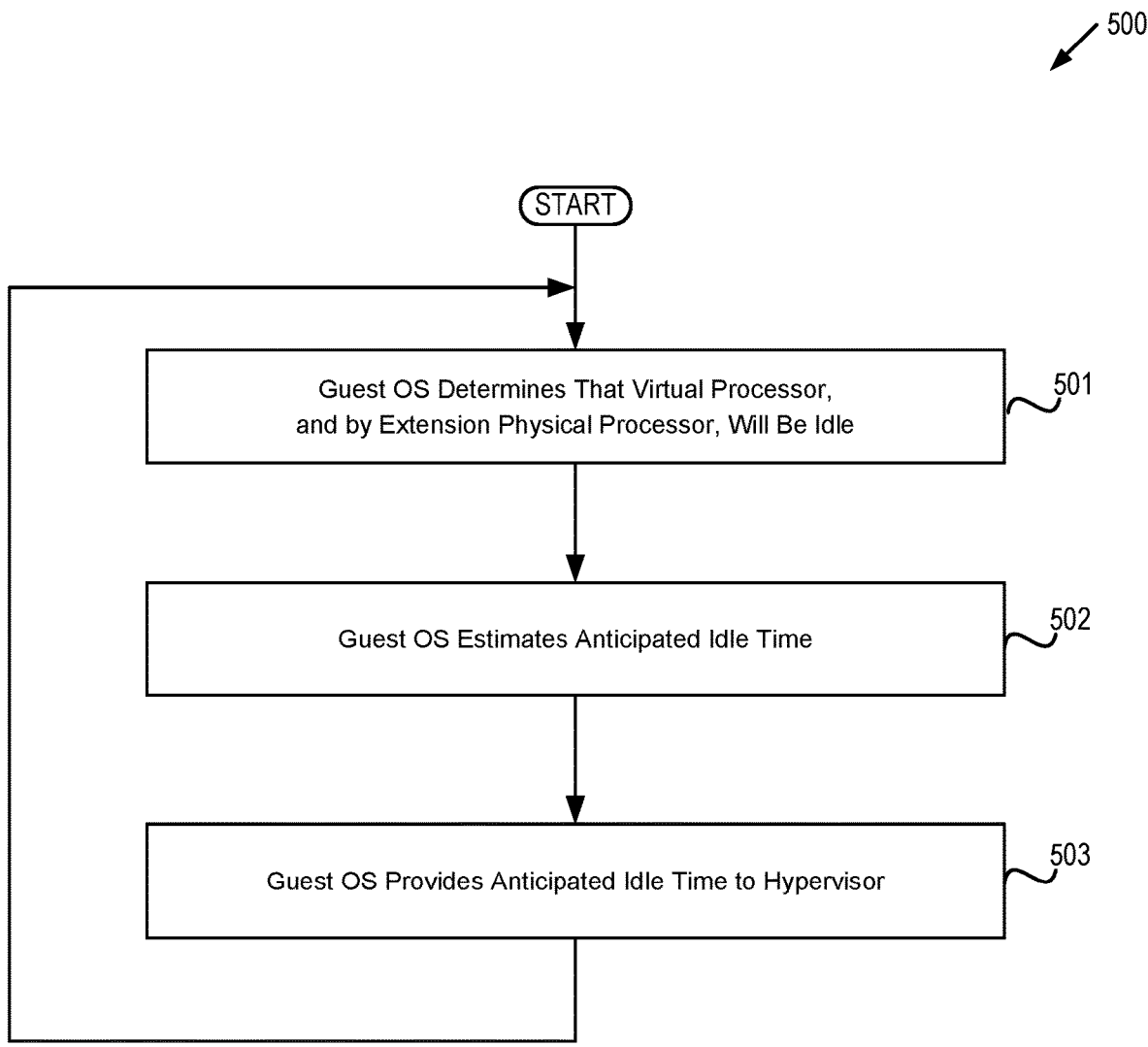
FIG. 5 depicts a flow diagram of one example of a method by which a guest operating system provides to a hypervisor an anticipated idle time for a processor.

FIG. 5 depicts a flow diagram of one example of a method 500 by which a guest operating system provides to a hypervisor an anticipated idle time for a processor. The method is performed by processing logic that may comprise hardware (circuitry, dedicated logic, etc.), software (such as is run on a general purpose computer system or a dedicated machine), or a combination of both. In one embodiment, the method is performed by guest OS 220 with respect to CPU 160, while in some other embodiments, the method may be performed by a guest OS hosted by some other virtual machine and/or physical machine, or may be performed with respect to another CPU, or both. It should be noted that in some other embodiments blocks depicted in FIG. 5 may be performed simultaneously or in a different order than that depicted.

At block 501, guest OS 220 determines that virtual processor 260, and by extension CPU 160, will be idle. This determination may be in response, for example, to detecting that there are no tasks scheduled for execution by virtual processor 260, or that there are no interrupts currently scheduled for, or expected to be scheduled for, virtual processor 260 within a given time interval. In one embodiment, block 501 is performed by idle notification engine 225 of guest OS 220.

At block 502, guest OS 220 estimates an anticipated processor idle time. In one embodiment, guest OS 220 estimates the idle time based on historical idle times (e.g., by computing a simple average of prior processor idle times, by computing an exponential time-decayed average of prior processor idle times, etc.). In one embodiment, block 502 is performed by idle notification engine 225.

At block 503, guest OS 220 provides the anticipated idle time to hypervisor 125. In one embodiment, the anticipated idle time is provided via a message from idle notification engine 225 to idle processor manager 128.

Figure 6:
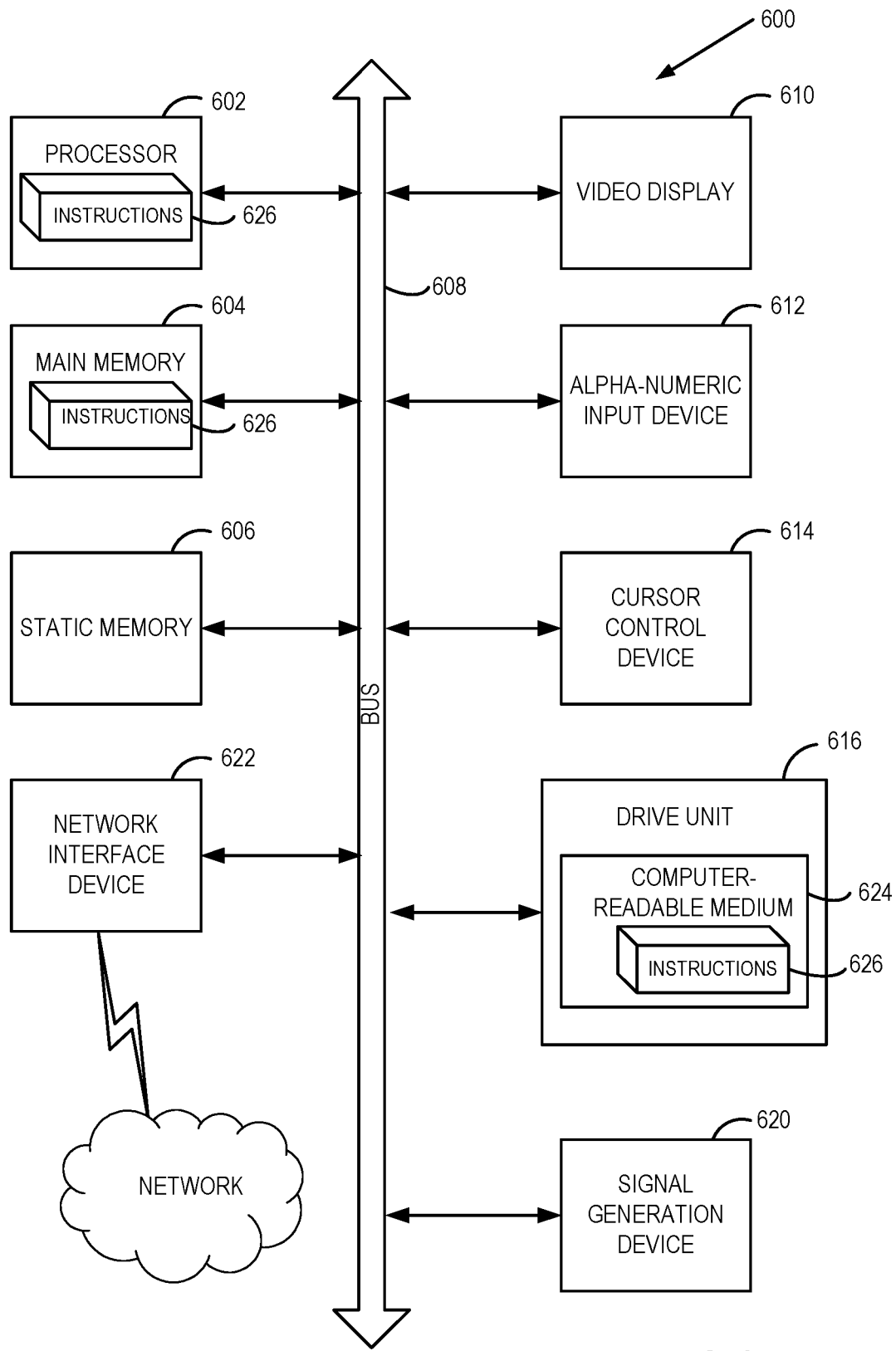
FIG. 6 depicts a block diagram of an illustrative computer system operating in accordance with embodiments of the disclosure.

FIG. 6 illustrates an illustrative computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 606.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions corresponding to one or more of the methods of FIGS. 3 through 5, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an illustrative embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "receiving," "executing," "halting," "providing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a hypervisor of a host comprising one or more physical processors, from a guest operating system (OS) of a virtual machine, an anticipated idle time for a physical processor of the one or more physical processors; and
   in response to determining, by the hypervisor, that a function of the anticipated idle time, received from the guest OS, exceeds an exit time of a first power state of a plurality of power states of the physical processor, causing the physical processor to be halted and placed in the first power state, wherein the function of the anticipated idle time is calculated using a performance multiplier.

2. The method of claim 1 wherein the function of the anticipated idle time is calculated by dividing the anticipated idle time by the performance multiplier.

3. The method of claim 1 wherein the function of the anticipated idle time comprises a quotient of the anticipated idle time divided by the performance multiplier, wherein the function of the anticipated idle time exceeds the exit time of the first power state by a first positive delta, and wherein every other power state of the plurality of power states satisfies one of the following two conditions:
   (i) the function of the anticipated idle time divided by the performance multiplier does not exceed an exit time of the other power state; or
   (ii) the function of the anticipated idle time exceeds the exit time of the other power state by a second positive delta that is larger than the first positive delta.

4. The method of claim 1 wherein the first power state is one of Advanced Configuration and Power Interface (ACPI) state C0, ACPI state C1, ACPI state C2, and ACPI state C3.

5. The method of claim 1 wherein the performance multiplier is based on an average load of the physical processor.

6. The method of claim 1 wherein the performance multiplier is based on a number of input/output wait tasks of the physical processor.

7. The method of claim 1 wherein the performance multiplier equals a sum of:
   an average load of the physical processor multiplied by a first positive real number;
   a number of input/output wait tasks of the physical processor multiplied by a second positive real number; and
   a third positive real number.

8. The method of claim 1 wherein the guest OS is to provide the anticipated idle time to the hypervisor by determining that a virtual processor associated with the physical processor is to be idle due to a lack of tasks scheduled for execution by the virtual processor or a lack of interrupts scheduled within a predefined item interval.

9. The method of claim 1 further comprising:
   in response to determining that the function of the anticipated idle time does not exceed an exit time of any of the plurality of power states of the physical processor, refraining from changing a current power state of the physical processor and setting a flag indicating that no power state was selected.

10. A system comprising:
    a memory to store a virtual machine that hosts a guest operating system (OS); and
    one or more physical processors, operatively coupled to the memory, to:
    execute a hypervisor,
    receive, by the hypervisor, from the guest OS, an anticipated idle time for a physical processor of the one or more physical processors; and
    in response to determining, by the hypervisor, that a function of the anticipated idle time, received from the guest OS, exceeds an exit time of a first power state of a plurality of power states of the physical processor, cause the physical processor to be halted and placed in the first power state, wherein the function of the anticipated idle time is calculated using a performance multiplier.

11. The system of claim 10 wherein the function of the anticipated idle time comprises a quotient of the anticipated idle time divided by the performance multiplier, wherein the function of the anticipated idle time exceeds the exit time of the first power state by a first positive delta, and wherein every other power state of the plurality of power states satisfies one of the following two conditions:
    (i) the function of the anticipated idle time divided by the performance multiplier does not exceed an exit time of the other power state; or
    (ii) the function of the anticipated idle time exceeds the exit time of the other power state by a second positive delta that is larger than the first positive delta.

12. The system of claim 10 wherein the first power state is one of Advanced Configuration and Power Interface (ACPI) state C0, ACPI state C1, ACPI state C2, and ACPI state C3.

13. The system of claim 10 wherein the performance multiplier is based on an average load of the physical processor.

14. The system of claim 10 wherein the performance multiplier is based on a number of input/output wait tasks of the physical processor.

15. The system of claim 10 wherein the performance multiplier equals a sum of:
    an average load of the physical processor multiplied by a first positive real number;
    a number of input/output wait tasks of the physical processor multiplied by a second positive real number; and
    a third positive real number.

16. The system of claim 10 wherein the guest OS is to provide the anticipated idle time to the hypervisor by determining that a virtual processor associated with the physical processor is to be idle due to a lack of tasks scheduled for execution by the virtual processor or a lack of interrupts scheduled within a predefined item interval.

17. The system of claim 10 wherein the hypervisor is further to:
    in response to determining that the function of the anticipated idle time does not exceed an exit time of any of the plurality of power states of the physical processor, refrain from changing a current power state of the physical processor and set a flag indicating that no power state was selected.

18. A non-transitory computer readable storage medium, having instructions stored therein, which when executed, cause one or more physical processors of a host to execute a hypervisor to perform operations comprising:
    receiving, by the hypervisor, from a guest operating system (OS) of a virtual machine, an anticipated idle time for a physical processor of the one or more physical processors; and
    in response to determining, by the hypervisor, that a function of the anticipated idle time, received from the guest OS, exceeds an exit time of a first power state of a plurality of power states of the physical processor, causing the physical processor to be halted and placed in the first power state, wherein the function of the anticipated idle time is calculated using a performance multiplier.

19. The non-transitory computer readable storage medium of claim 18, wherein the plurality of power states are ACPI state C0, ACPI state C1, ACPI state C2, and ACPI state C3.

20. The non-transitory computer readable storage medium of claim 18, wherein the performance multiplier is based on at least one of an average load of the physical processor, or a number of input/output wait tasks of the physical processor.

\* \* \* \* \*

UNITED STATES PATENT AND TRADEMARK OFFICE
CERTIFICATE OF CORRECTION

| | | |
|---|---|---|
| PATENT NO. | : 11,157,302 B2 | |
| APPLICATION NO. | : 16/411105 | |
| DATED | : October 26, 2021 | |
| INVENTOR(S) | : Henri Han van Riel and Michael Tsirkin | |

It is certified that error appears in the above-identified patent and that said Letters Patent is hereby corrected as shown below:

On the Title Page

Item (73) Assignee, change from:
Red Hat, Inc., Raleigh, NC (US)
To:
Red Hat Israel, Ltd., Raanana (IL)

Signed and Sealed this
Fifth Day of March, 2024

Katherine Kelly Vidal
*Director of the United States Patent and Trademark Office*